United States Patent
Nguyen et al.

(10) Patent No.: US 7,734,146 B1
(45) Date of Patent: Jun. 8, 2010

(54) VIDEO DATA REDUCTION IN MPEG BIT STREAM

(75) Inventors: An H. Nguyen, Fremont, CA (US); Trung T. Nguyen, San Jose, CA (US); Gaetano Bonfiglio, Fremont, CA (US); Yin Shih, Saratoga, CA (US)

(73) Assignee: Seagate Technology, Scotts Valley, CA (US)

( * ) Notice: Subject to any disclaimer, the term of this patent is extended or adjusted under 35 U.S.C. 154(b) by 935 days.

(21) Appl. No.: 11/485,171

(22) Filed: Jul. 11, 2006

(51) Int. Cl.
  *H04N 5/91* (2006.01)
  *H04N 7/26* (2006.01)
(52) U.S. Cl. .................... 386/68; 386/111
(58) Field of Classification Search ............. 386/68, 386/69, 109, 111, 112, 124, 125
  See application file for complete search history.

(56) References Cited

U.S. PATENT DOCUMENTS

| | | | | |
|---|---|---|---|---|
| 5,377,051 A | * | 12/1994 | Lane et al. | 386/81 |
| 5,956,454 A | * | 9/1999 | Shinohara et al. | 386/68 |
| 2006/0093032 A1 | * | 5/2006 | Shindo | 375/240.03 |

* cited by examiner

*Primary Examiner*—Robert Chevalier
(74) *Attorney, Agent, or Firm*—David K. Lucente

(57) ABSTRACT

Video data in an encoded frame is reduced by adjusting orthogonal transform coefficients in the encoded frame during trick play operation such as fast forward or fast reverse. The orthogonal transform coefficients are adjusted by selecting essential orthogonal transform coefficients with high energy and non-essential orthogonal transform coefficients with low energy, maintaining or strengthening the essential orthogonal transform coefficients and attenuating or removing the non-essential orthogonal transform coefficients. In an MPEG bit stream, the encoded frame is an I-frame and the orthogonal transform coefficients are discrete cosine transform (DCT) coefficients.

18 Claims, 5 Drawing Sheets

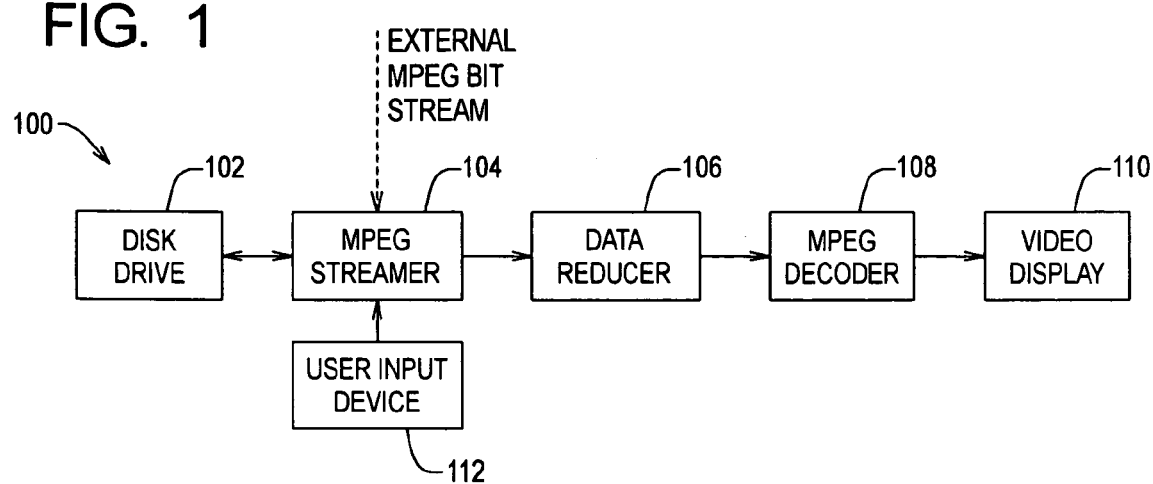

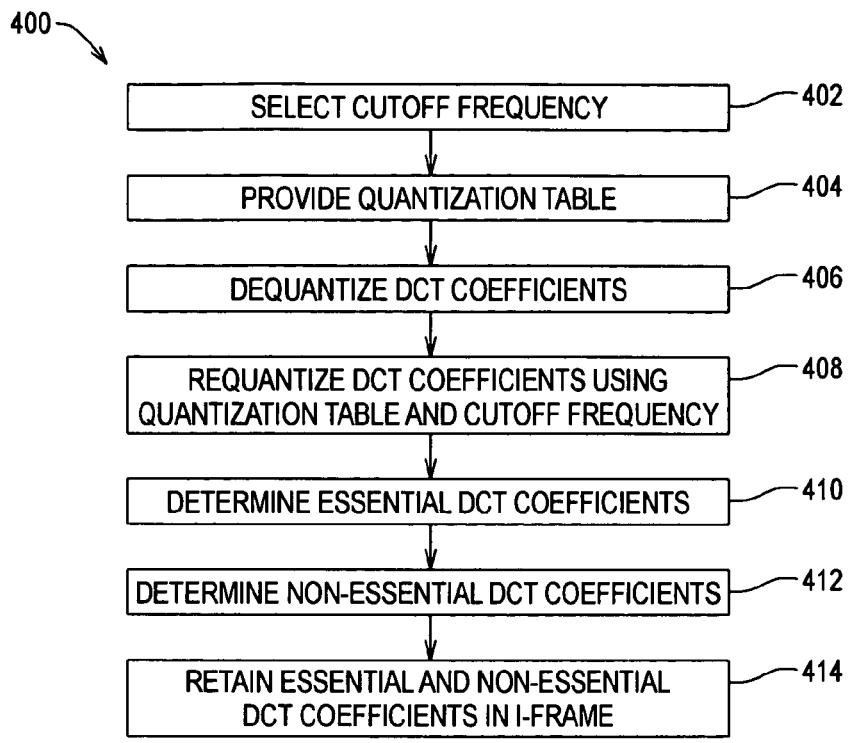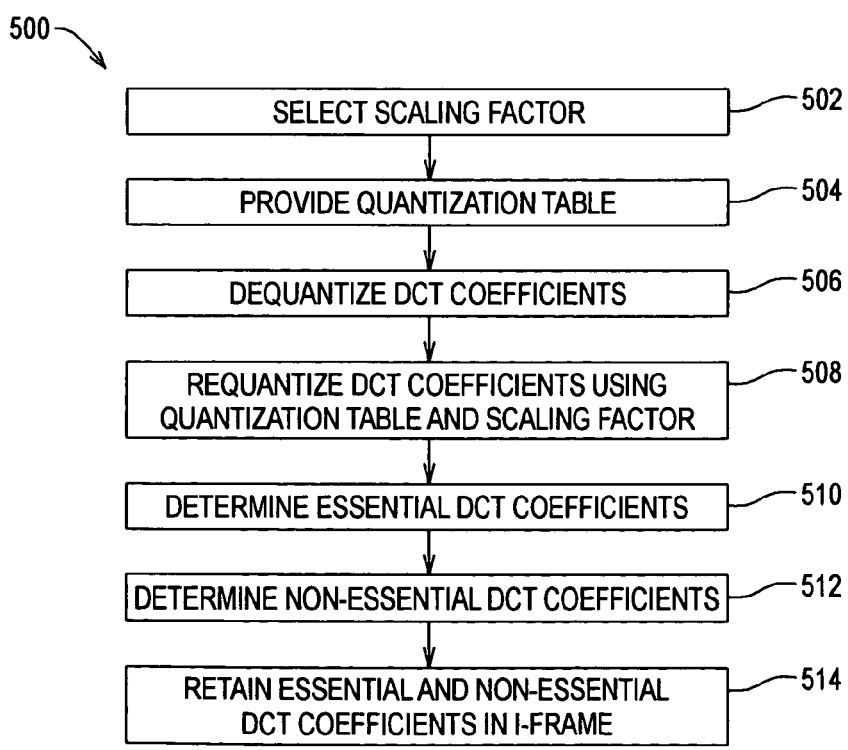

VIDEO DATA REDUCTION IN MPEG BIT STREAM

FIELD OF THE INVENTION

The present invention relates to video data reduction, and in particular to video data reduction in MPEG bit streams.

BACKGROUND OF THE INVENTION

Video data transmission is becoming increasingly important in business and home applications such as video storage and playback systems. Video images (pictures) of video data are represented by frames of luminance and chrominance picture signals. Since the frames contain large amounts of video data, image compression is used to increase transmission rates.

Static image compression such as JPEG removes redundant video data in the spatial domain. Moving image compression such as MPEG removes redundant video data in both the spatial and time domains by taking advantage of intra-frame and inter-frame correlation.

Intra-frame correlation reduces video data spatial redundancy by converting the video data from the time domain to the frequency domain using an orthogonal transform to generate orthogonal transform coefficients.

For example, an 8×8 pixel block with luminance and chrominance amplitudes at the respective pixels is converted by a discrete cosine transform into 8×8 discrete cosine transform (DCT) coefficients. The first DCT coefficient is a DC (zero frequency) coefficient and the remaining 63 DCT coefficients are AC coefficients with increasingly higher frequencies.

Inter-frame correlation uses predictive encoding between successive frames. Since a fairly small change between successive frames is typical, transmission of the frame differences generated by predictive encoding is usually more efficient than transmission of the frames. However, the frames cannot be restored if only the frame differences are transmitted. Therefore, the frames are occasionally transmitted without predictive encoding as a reference for the frame differences.

Pictures encoded with intra-frame correlation are referred to as intra-pictures or I-frames. Pictures encoded with predictive encoding relative to one preceding picture are referred to as predictive pictures or P-frames. Pictures encoded with predictive encoding relative to at most two pictures (either the following picture or both the preceding and following pictures) are referred to as bi-directionally predictive pictures or B-frames.

P-frames follow an I-frame or a P-frame. B-frames can predictively encode two I-frames, two P-frames or one of each using a reference picture based on the mean value of the two pictures. Picture groups include an I-frame and P-frames and B-frames derived from the I-frame.

For example, a picture group is provided by frames F1, F2, F3 . . . F17. The leading frame F1 is an I-frame, the second frame F2 is a B-frame, the third frame F3 is a P-frame, and the fourth and the following frames F4 to F17 are alternately B-frames and P-frames.

Video systems are increasingly expected to provide trick play operation, such as fast forward and fast reverse, in addition to normal play operation. During trick play operation, the video data is transmitted at a higher transmission rate than during normal play operation.

Video systems have been designed with higher transmission bandwidths to accommodate higher transmission rates during trick play operation, however this increases costs. Video systems have also been designed to drop some or all of the P-frames and B-frames during trick play operation and reconstruct the video data using the I-frames. However, the I-frames are considerably larger than the P-frame and B-frame counterparts. As a result, the decoder that performs the inverse discrete cosine transform on the MPEG data to generate the video data exhibits a processing bottleneck, thereby creating a low perceived motion rate of the video images. Video systems have also been designed to drop some of the I-frames during trick play operation, however this degrades the picture quality.

Therefore, there is a need for video data reduction in MPEG bit streams that preserves picture quality without increasing transmission bandwidth requirements and associated costs.

SUMMARY OF THE INVENTION

The present invention reduces video data in an encoded frame by adjusting orthogonal transform coefficients in the encoded frame during trick play operation.

In an embodiment, adjusting the orthogonal transform coefficients includes selecting essential orthogonal transform coefficients with high energy and non-essential orthogonal transform coefficients with low energy, maintaining or strengthening the essential orthogonal transform coefficients, and attenuating or removing the non-essential orthogonal transform coefficients.

In another embodiment, adjusting the orthogonal transform coefficients includes selecting essential orthogonal transform coefficients within a frequency range and non-essential orthogonal transform coefficients outside the frequency range, maintaining or strengthening the essential orthogonal transform coefficients, and attenuating or removing the non-essential orthogonal transform coefficients.

In another embodiment, adjusting the orthogonal transform coefficients includes selecting essential orthogonal transform coefficients above a scaling factor and non-essential orthogonal transform coefficients below the scaling factor, maintaining or strengthening the essential orthogonal transform coefficients, and attenuating or removing the non-essential orthogonal transform coefficients.

In another embodiment, adjusting the orthogonal transform coefficients includes selecting essential orthogonal transform coefficients within a frequency range and non-essential orthogonal transform coefficients outside the frequency range, maintaining or strengthening the essential orthogonal transform coefficients, and attenuating the non-essential orthogonal transform coefficients such that the attenuation gradually increases as the frequency increases.

In another embodiment, adjusting the orthogonal transform coefficients includes selecting essential orthogonal transform coefficients above a scaling factor and non-essential orthogonal transform coefficients below the scaling factor, maintaining or strengthening the essential orthogonal transform coefficients, and attenuating the non-essential orthogonal transform coefficients such that the attenuation gradually increases as the frequency increases.

In another embodiment, the encoded frame is an I-frame in an MPEG bit stream and the orthogonal transform coefficients are DCT coefficients.

In another embodiment, a video system such as a consumer electronics device transmits the bit stream from a video source such as a disk drive to a video display, the encoded frame with reduced video data and decoded, and a video image is displayed in response to the video data from the decoded frame in accordance with the trick play operation.

Advantageously, adjusting the orthogonal transform coefficients avoids processing bottlenecks during trick play operation, thereby smoothening the video images and reducing transmission bandwidth requirements and associated costs.

BRIEF DESCRIPTION OF THE DRAWINGS

These and other features, aspects and advantages of the present invention will be better understood with reference to the following description and accompanying figures where:

FIG. 1 shows a video storage and playback system in which the present invention can be implemented;

FIG. 4 shows a flowchart of DCT coefficient attenuation using a cutoff frequency to reduce video data in an I-frame in an MPEG bit stream;

FIG. 5 shows a flowchart of DCT coefficient attenuation using a scaling factor to reduce video data in an I-frame in an MPEG bit stream.

DETAILED DESCRIPTION OF THE INVENTION

Figure 2A:
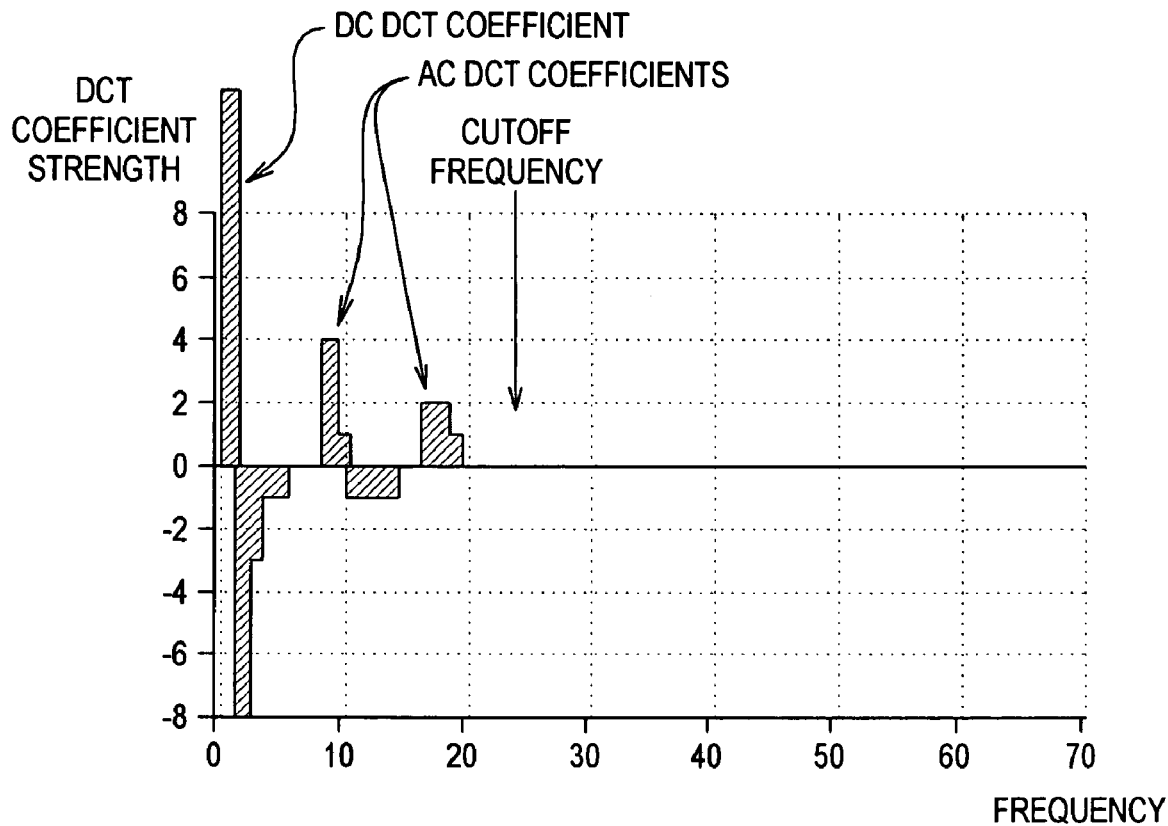
FIGS. 2A and 2B show a graph and a flowchart of DCT coefficient removal using a cutoff frequency to reduce video data in an I-frame in an MPEG bit stream.

FIG. 1 shows a video storage and playback system 100 in which the present invention can be implemented. The video system 100 includes a disk drive 102 for storing MPEG data, an MPEG streamer 104 for generating an MPEG bit stream based on MPEG data from the disk drive 102, a data reducer 106 for reducing video data in the MPEG bit stream, an MPEG decoder 108 for decoding the MPEG bit stream to generate decoded video data, a video display 110 for displaying video images to a user in response to the decoded video data, and a user input device 112 (such as a remote control) for providing normal play and trick play commands.

The MPEG streamer 104 receives an external MPEG bit stream and identifies, breaks out and classifies the compressed audio and video data and related tables for more efficient storage in the disk drive 102. The MPEG streamer 104 stores the MPEG data along with time stamps in the disk drive 102.

During normal play operation, the MPEG streamer 104 retrieves the MPEG data from the disk drive 102 and regenerates the MPEG bit stream. For example, the MPEG streamer 104 uses the time stamps for temporal reassembly of the MPEG data, determines the I-frames, P-frames and B-frames from the MPEG data, and places the I-frames, P-frames and B-frames in the MPEG bit stream in appropriate order for normal viewing. The I-frames, P-frames and B-frames include DCT coefficients obtained from a discrete cosine transform of the original video data. The data reducer 106 transfers the MPEG bit stream from the MPEG streamer 104 to the MPEG decoder 108 without adjustment. The MPEG decoder 108 transforms the MPEG bit stream into decoded video data using an inverse discrete cosine transform, and the video display 110 displays the video images based on the decoded video data. The normal play operation is conventional.

During fast forward operation, the MPEG streamer 104 retrieves the MPEG data from the disk drive 102 and regenerates the MPEG bit stream. The MPEG streamer 104 places the I-frames in the MPEG bit stream but does not place the P-frames or the B-frames in the MPEG bit stream. The I-frames include DCT coefficients obtained from a discrete cosine transform of the video data. Furthermore, the data reducer 106 adjusts the DCT coefficients in the I-frames, thereby reducing the video data in the I-frames, and transfers the MPEG bit stream (with reduced video data) to the MPEG decoder 108. The MPEG decoder 108 transforms the MPEG bit stream into decoded video data, and the video display 110 displays the video images based on the decoded video data.

During fast reverse operation, the fast forward operation is generally implemented except that the MPEG streamer 104 places the I-frames in the MPEG bit stream in reverse order.

The fast forward and fast reverse operations are generally similar to the normal play operation except that (1) the data transmission rate is increased to provide faster speed play (as is conventional), (2) some or all of the P-frames and B-frames are dropped from the MPEG bit stream (as is conventional), and (3) the data reducer 106 adjusts the DCT coefficients in the I-frames to reduce the video data in the I-frames (in accordance with the present invention).

Advantageously, adjusting the DCT coefficients avoids a processing bottleneck in the MPEG decoder 108, thereby increasing the transmission rate of the MPEG bit stream and smoothening the video images on the video display 110. Moreover, adjusting the DCT coefficients retains sufficient video data in the MPEG bit stream to preserve human vision sensitivity of the video images, thereby avoiding a low perceived motion rate of the video images that would otherwise occur due to a processing bottleneck in the MPEG decoder 108. As a result, adjusting the DCT coefficients reduces transmission bandwidth requirements and associated costs of the video system 100 while preserving picture quality.

The present invention includes several approaches for adjusting the DCT coefficients to reduce the video data in the I-frames during fast forward and fast reverse operations. These approaches include (1) DCT coefficient removal using a cutoff frequency, (2) DCT coefficient removal using a scaling factor, (3) DCT coefficient attenuation using a cutoff frequency, and (4) DCT coefficient attenuation using a scaling factor.

DCT Coefficient Removal Using Cutoff Frequency

FIG. 2A shows a graph of DCT coefficient removal using a cutoff frequency to reduce video data in an I-frame. The essential DCT coefficients (including a DC coefficient and several AC coefficients) below the cutoff frequency are maintained, and the non-essential DCT coefficients above the cutoff frequency are truncated.

Figure 2B:
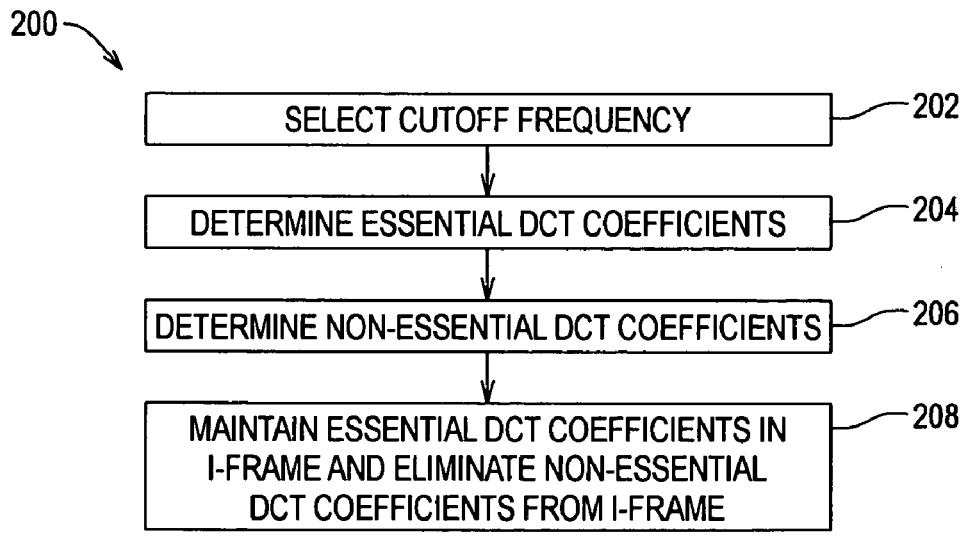

FIG. 2B shows a flowchart 200 of DCT coefficient removal using a cutoff frequency to reduce video data in an I-frame. The cutoff frequency is selected (step 202), the essential (low frequency) DCT coefficients are determined using the cutoff frequency (step 204), the non-essential (high frequency) DCT coefficients are determined using the cutoff frequency (step 206) and the essential DCT coefficients are maintained in the I-frame while the non-essential DCT coefficients are eliminated from the I-frame (step 208).

The DCT coefficients are adjusted by maintaining the essential DCT coefficients and removing the non-essential DCT coefficients. However, the essential DCT coefficients can be maintained or strengthened, and the non-essential DCT coefficients can be attenuated or removed. In addition, the cutoff frequency is based on the desired transmission rate through the MPEG decoder 108 and can define an end of block such that only a predetermined number or percentage of the DCT coefficients are maintained.

The essential DCT coefficients have the highest strengths and the non-essential DCT coefficients have the lowest strengths. As a result, most of the energy of the original video image is maintained in the I-frame after removing the non-essential DCT coefficients. Although removing the non-essential DCT coefficients causes some degradation of the video image displayed by the video display 110, the picture quality remains acceptable.

DCT Coefficient Removal Using Scaling Factor

Figure 3A:
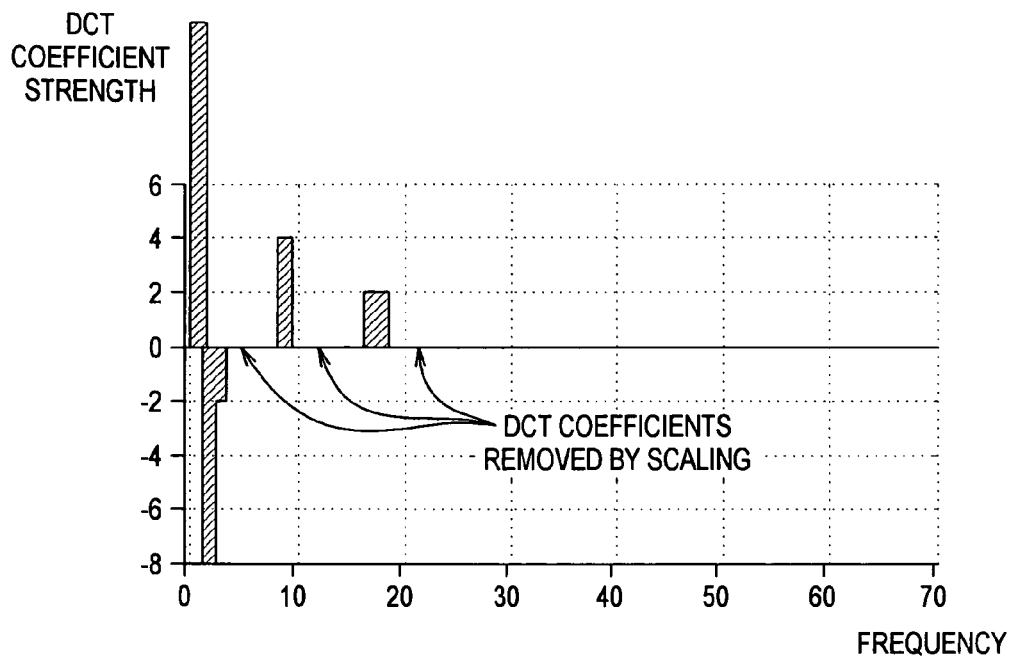
FIGS. 3A and 3B show a graph and a flowchart of DCT coefficient removal using a scaling factor to reduce video data in an I-frame in an MPEG bit stream.

FIG. 3A shows a graph of DCT coefficient removal using a scaling factor to reduce video data in an I-frame. The essential DCT coefficients (including a DC coefficient and several AC coefficients) above the scaling factor are maintained, and the non-essential DCT coefficients below the scaling factor are removed.

Figure 3B:
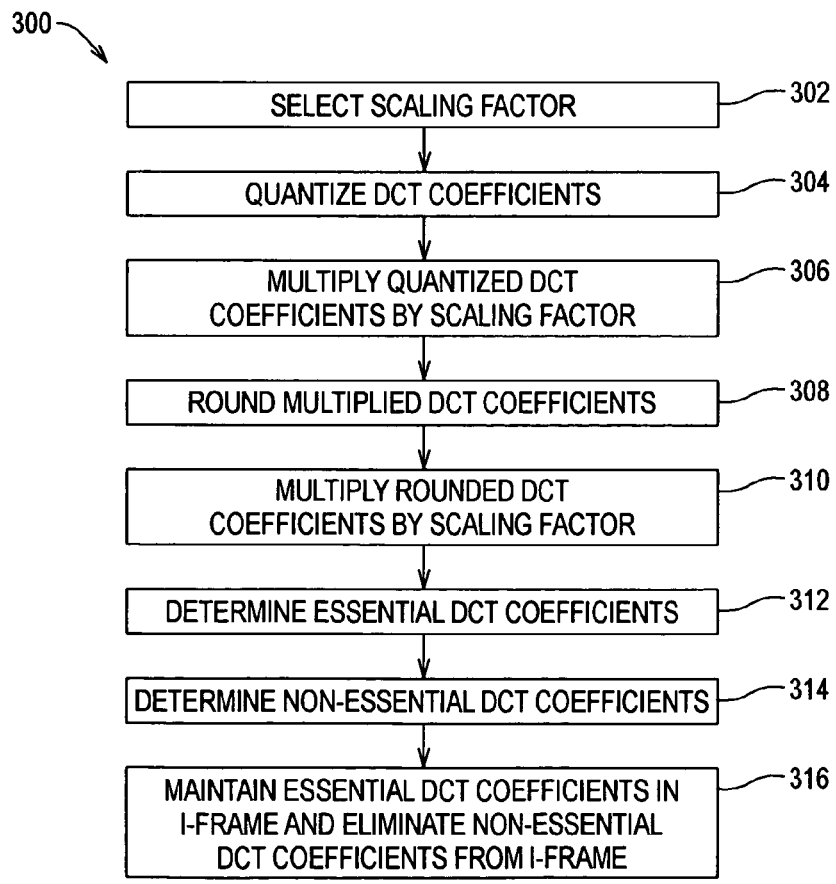

FIG. 3B shows a flowchart 300 of DCT coefficient removal using a scaling factor to reduce video data in an I-frame. The scaling factor is selected (step 302), the DCT coefficients are quantized (step 304), the quantized DCT coefficients are multiplied by the scaling factor (step 306), the multiplied DCT coefficients are rounded (step 308), the rounded DCT coefficients are multiplied by the scaling factor (step 310), the essential (high magnitude) DCT coefficients are determined (step 312), the non-essential (low magnitude) DCT coefficients are determined (step 314) and the essential DCT coefficients are maintained in the I-frame while the non-essential DCT coefficients are eliminated from the I-frame (step 316).

The DCT coefficients are adjusted by maintaining the essential DCT coefficients and removing the non-essential DCT coefficients. However, the essential DCT coefficients can be maintained or strengthened, and the non-essential DCT coefficients can be attenuated or removed. In addition, the scaling factor is based on the desired transmission rate through the MPEG decoder 108.

The essential DCT coefficients have the highest strengths and the non-essential DCT coefficients have the lowest strengths. As a result, most of the energy of the original video image is maintained in the I-frame after removing the non-essential DCT coefficients. Although removing the non-essential DCT coefficients causes some degradation of the video image displayed by the video display 110, the picture quality remains acceptable.

DCT Coefficient Attenuation Using Cutoff Frequency

FIG. 4 shows a flowchart 400 of DCT coefficient attenuation using a cutoff frequency with dequantization and requantization to reduce video data in an I-frame. The cutoff frequency is selected (step 402), a quantization table is provided in the MPEG bit stream (step 404), the DCT coefficients are dequantized (step 406) and then requantized using the quantization table (step 408) so that the essential (low frequency) DCT coefficients are determined and strengthened (step 410), the non-essential (high frequency) DCT coefficients are determined and reduced (but not eliminated) with gradually increasing attenuation as the frequency increases (step 412) and the essential and non-essential DCT coefficients are retained in the I-frame (step 414).

The DCT coefficients are adjusted by strengthening the essential DCT coefficients and attenuating the non-essential DCT coefficients. However, the essential DCT coefficients can be maintained, and some non-essential DCT coefficients can be gradually attenuated and others removed as the frequency increases. In addition, the requantization is based on the desired transmission rate through the MPEG decoder 108.

The essential DCT coefficients have the highest strengths and the non-essential DCT coefficients have the lowest strengths. As a result, most of the energy of the original video image is maintained in the I-frame after attenuating the non-essential DCT coefficients. Although attenuating the non-essential DCT coefficients causes some degradation of the video image displayed by the video display 110, the picture quality remains acceptable.

DCT Coefficient Attenuation Using Scaling Factor

FIG. 5 shows a flowchart 500 of DCT coefficient attenuation using a scaling factor with dequantization and requantization to reduce video data in an I-frame. The scaling factor is selected (step 502), a quantization table is provided in the MPEG bit stream (step 504), the DCT coefficients are dequantized (step 506) and then requantized using the quantization table (step 508) so that the essential (high magnitude) DCT coefficients are determined and strengthened (step 510), the non-essential (low magnitude) DCT coefficients are determined and reduced (but not eliminated) with gradually increasing attenuation as the frequency increases (step 512) and the essential and non-essential DCT coefficients are retained in the I-frame (step 514).

The DCT coefficients are adjusted by strengthening the essential DCT coefficients and attenuating the non-essential DCT coefficients. However, the essential DCT coefficients can be maintained, and some non-essential DCT coefficients can be gradually attenuated and others removed as the frequency increases. In addition, the requantization is based on the desired transmission rate through the MPEG decoder 108.

The essential DCT coefficients have the highest strengths and the non-essential DCT coefficients have the lowest strengths. As a result, most of the energy of the original video image is maintained in the I-frame after attenuating the non-essential DCT coefficients. Although attenuating the non-essential DCT coefficients causes some degradation of the video image displayed by the video display 110, the picture quality remains acceptable.

Figure 6:
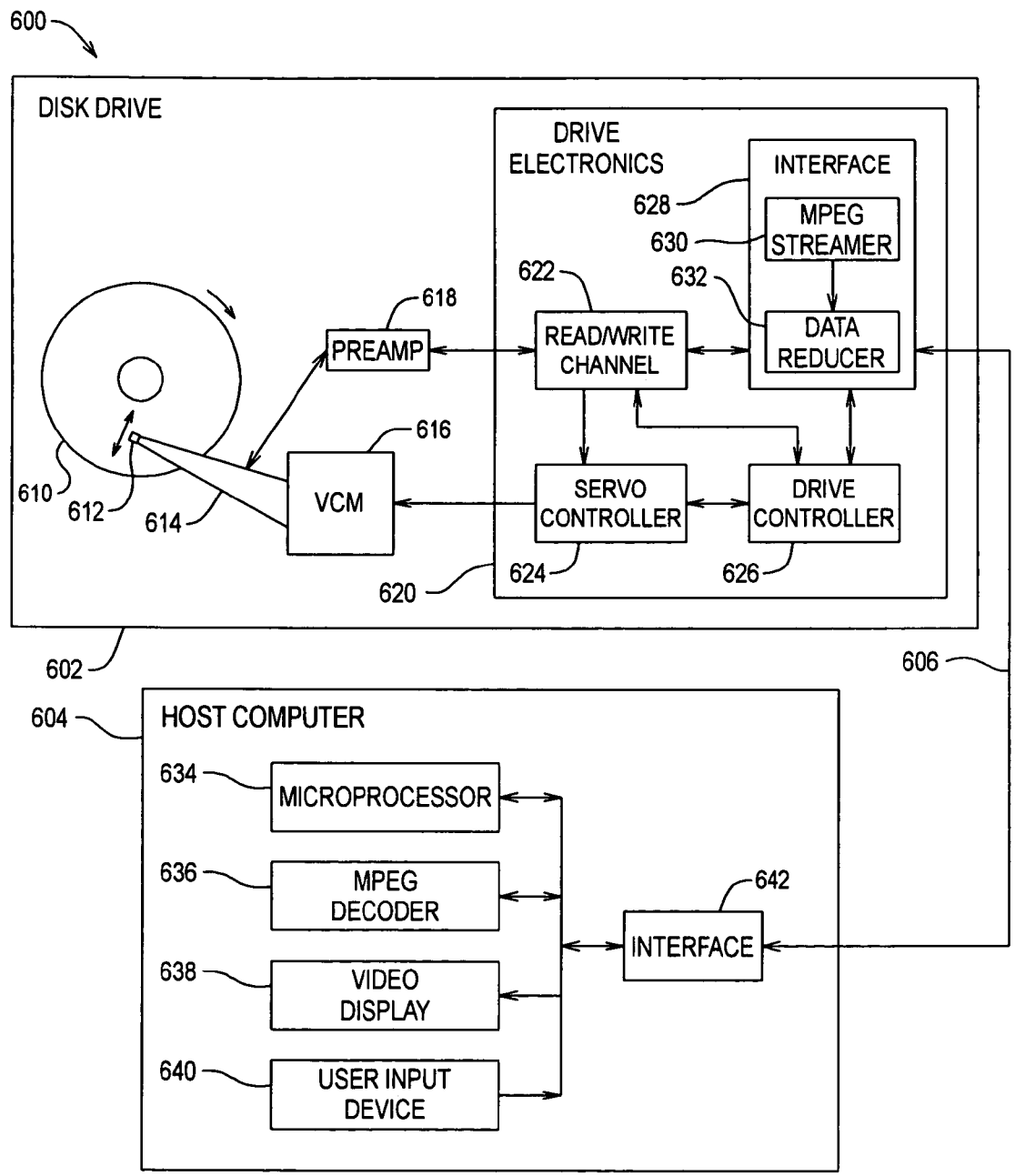
FIG. 6 shows another video storage and playback system in which the present invention can be implemented.

FIG. 6 shows another video storage and playback system 600 in which the present invention can be implemented. The video system 600 includes a disk drive 602, a host computer 604 and a bus 606. The disk drive 602 and the host computer 604 communicate over the bus 606 using the 1394 protocol.

The disk drive 602 includes a disk 610, a head 612, an actuator arm assembly 614, a voice coil motor (VCM) 616, a preamplifier 618 and drive electronics 620. The drive electronics 620 are mounted on a printed circuit board and include a read/write channel 622, a servo controller 624, a drive controller 626 and an interface 628. The interface 628 includes an MPEG streamer 630 (similar to MPEG streamer 104) and a data reducer 632 (similar to data reducer 106).

The disk drive 602 receives read and write requests from the host computer 604 and carries out the requests by performing data transfers between the host computer 604 and the disk 610. The disk drive 602 can include multiple disks 610 in a vertical stack and multiple heads 612 with one head 612 for each operative disk surface. Single-sided disk arrangements can also be used.

The disk 610 stores user data such as MPEG data, the head 612 reads from and writes to the disk 610, the actuator arm assembly 614 supports the head 612, and the VCM 616 rotates about a bearing to position the head 612 relative to the disk 610. The preamplifier 618 amplifies read signals from the head 612.

The channel 622 performs data transformations on data transferred to and from the disk 610. For example, during a write operation, the channel 622 converts digital data received from the host computer 604 into an analog write current for delivery to the head 612. During a read operation, the channel 622 converts an analog read signal from the head 612 into a digital representation that can be recognized by the host computer 604. The channel 622 also separates out servo information read by the head 612 and directs the servo information to the servo controller 624 for positioning the head 612. The servo controller 624 sends a control signal to the VCM 616 to position the head 612 relative to the disk 610, and the drive controller 626 is a microprocessor that controls the operations of the disk drive 602.

The interface 628 provides data buffering between the host computer 604 and the channel 622 during read and write operations, and directs commands and requests from the host computer 604 to the drive controller 626. The interface 628 also includes the MPEG streamer 630 and the data reducer 632 for video data reduction during trick play operation.

The host computer 604 includes a microprocessor 634, an MPEG decoder 636 (similar to MPEG decoder 108), a video display 638 (similar to video display 110), a user input device 640 (similar to user input device 112) and an interface 642. The microprocessor 634 controls the operations of the host computer 604, and the interface 642 communicates with the bus 606.

During trick play operation, the disk drive 602 receives a request for MPEG data from the host computer 604. The disk drive 602 retrieves the MPEG data from the disk 610 using the head 612, creates the MPEG bit stream using the MPEG streamer 630, adjusts the DCT coefficients in the I-frames to reduce video data in the I-frames using the data reducer 632 and sends the MPEG bit stream with reduced video data across the bus 606 to the host computer 604. The host computer 604 decodes the I-frames using the MPEG decoder 636 and displays the video images using the video display 638.

The video systems described above can be modified in numerous manners. For example, in the video system 100, the MPEG streamer 104 can receive the external MPEG bit stream from a remote video source over a wireless transmission link and route the external MPEG bit stream directly to the data reducer 106 without storage on the disk drive 102 for real-time video display. In the video system 600, the MPEG streamer 630 and the data reducer 632 can be implemented by the drive controller 626. Likewise, the MPEG decoder 636 can be implemented by the disk drive 602 rather than the host computer 604 and the decoded video data can be sent from the disk drive 602 to the host computer 604. Similarly, the disk drive 602 can be remote to the host computer 604 and the bus 606 can be a wireless transmission link. Furthermore, the video systems can be various consumer electronics devices such as a digital television, personal computer, DVD player and so on.

The present invention is applicable to a wide variety of video encoding schemes and encoded frames that include orthogonal transform coefficients generated by transforming the video data from the time domain to the frequency domain. Suitable orthogonal transform coefficients include discrete cosine transform (DCT) coefficients, discrete sine transform (DST) coefficients and discrete wavelet transform (DWT) coefficients. Therefore, the present invention is not limited to MPEG bit streams, DCT coefficients or I-frames.

The present invention has been described in considerable detail with reference to certain preferred versions, however other versions are possible. Therefore, the spirit and scope of the appended claims should not be limited to the description of the preferred versions contained herein.

What is claimed is:

1. A method comprising:
providing a bit stream that includes an encoded frame of video data from a video source, wherein the encoded frame includes orthogonal transform coefficients generated by transforming the video data from a time domain to a frequency domain;
adjusting the orthogonal transform coefficients in response to a trick play operation, thereby reducing the video data in the encoded frame; and
decoding the encoded frame after adjusting the orthogonal transform coefficients.

2. The method of claim 1, wherein the bit stream is an MPEG bit stream.

3. The method of claim 1, wherein the encoded frame is an I-frame.

4. The method of claim 1, wherein the orthogonal transform coefficients are discrete cosine transform (DCT) coefficients, discrete sine transform (DST) coefficients or discrete wavelet transform (DWT) coefficients.

5. The method of claim 1 further comprising displaying a video image on a video display in response to the video data from the decoded frame in accordance with the trick play operation.

6. The method of claim 5, wherein the trick play operation is a fast reverse operation.

7. The method of claim 5, wherein the video source and the video display are coupled by a wireless transmission link.

8. The method of claim 1, wherein the video source is a disk drive.

9. The method of claim 8, wherein adjusting the orthogonal transform coefficients occurs in the disk drive.

10. The method of claim 9, wherein decoding the encoded frame occurs outside the disk drive.

11. The method of claim 1, wherein adjusting the orthogonal transform coefficients includes at least one of maintaining essential orthogonal transform coefficients, strengthening essential orthogonal transform coefficients, attenuating non-essential orthogonal transform coefficients and removing non-essential orthogonal transform coefficients.

12. The method of claim 1, wherein adjusting the orthogonal transform coefficients includes:
selecting essential orthogonal transform coefficients by at least one of the following criterial:
with high energy and non-essential orthogonal transform coefficients with low energy
within a frequency range and non-essential orthogonal transform coefficients outside the frequency range; and
above a scaling factor and non-essential orthogonal transform coefficients below the scaling factor.

13. The method of claim 12, including dequantizing the orthogonal transform coefficients and then requantizing the orthogonal transform coefficients, thereby strengthening the essential orthogonal transform coefficients and attenuating the non-essential orthogonal transform coefficients.

14. A method of transmitting video data from a video source to a video display, comprising:
providing an MPEG bit stream that includes an I-frame of video data from the video source, wherein the I-frame includes discrete cosine transform (DCT) coefficients generated by transforming the video data from the time domain to the frequency domain;
adjusting the DCT coefficients in response to a fast forward operation, thereby reducing the video data in the I-frame;
decoding the I-frame after adjusting the DCT coefficients to provide decoded video data; and displaying a video image on the video display in response to the decoded video data in accordance with the fast forward operation.

15. The method of claim 14, wherein the video includes a wireless transmission link between the video source and the video display.

16. The method of claim 14, wherein adjusting the DCT coefficients includes maintaining or strengthening essential DCT coefficients and attenuating or removing non-essential DCT coefficients.

17. The method of claim 14, wherein adjusting the DCT coefficients includes at least one of the group of:

selecting essential DCT coefficients with high energy and non-essential DCT coefficients with low energy;

selecting essential DCT coefficients within a frequency range and non-essential DCT coefficients outside the frequency range;

selecting essential DCT coefficients above a scaling factor and non-essential DCT coefficients below the scaling factor.

18. The method of claim 17, including at least one of a group of maintaining the essential DCT coefficients, strengthening the essential DCT coefficients, attenuating the non-essential DCT coefficients and removing the non-essential DCT coefficients.

* * * * *